United States Patent
Kim et al.

(10) Patent No.: US 10,700,959 B2
(45) Date of Patent: Jun. 30, 2020

(54) SOURCE ROUTING DESIGN WITH SIMPLIFIED FORWARDING ELEMENTS

(71) Applicant: Barefoot Networks, Inc., Santa Clara, CA (US)

(72) Inventors: Changhoon Kim, Palo Alto, CA (US); Jeongkeun Lee, Mountain View, CA (US); Milad Sharif, Mountain View, CA (US); Robert Soule, San Carlos, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 15/948,946

(22) Filed: Apr. 9, 2018

(65) Prior Publication Data

US 2019/0182143 A1   Jun. 13, 2019

Related U.S. Application Data

(60) Provisional application No. 62/483,431, filed on Apr. 9, 2017, provisional application No. 62/640,559, filed
(Continued)

(51) Int. Cl.
*H04L 12/751* (2013.01)
*H04L 12/721* (2013.01)
(Continued)

(52) U.S. Cl.
CPC .......... *H04L 45/02* (2013.01); *H04L 41/0668* (2013.01); *H04L 41/0806* (2013.01);
(Continued)

(58) Field of Classification Search
CPC ..... H04L 45/02; H04L 41/0668; H04L 45/26; H04L 45/32; H04L 45/38; H04L 45/72; H04L 45/745
See application file for complete search history.

(56) References Cited

U.S. PATENT DOCUMENTS

| 7,471,669 B1 | 12/2008 | Sabesan et al. |
| 7,639,705 B2 | 12/2009 | Watanabe et al. |

(Continued)

FOREIGN PATENT DOCUMENTS

| EP | 1320224 A1 | 6/2003 |
| WO | 2019173406 A1 | 9/2019 |

OTHER PUBLICATIONS

Andersen, David G., et al., "Accountable Internet Protocol (AIP)," SIGCOMM'08, Aug. 17-22, 2008, 12 pages, ACM, Seattle, Washington, USA.
(Continued)

*Primary Examiner* — Duc C Ho
(74) *Attorney, Agent, or Firm* — Compass IP Law PC

(57) ABSTRACT

Some embodiments provide a network that includes (i) multiple forwarding elements, (ii) a set of one or more global control plane (GCP) servers, and (iii) multiple end-node machines. The GCP servers maintain topological information about connections between the forwarding elements. Each of the end-node machines receives the topological information, identifies a source-routing path for a message sent by the machine, and embeds the source-routing path in a source-routing message header that includes an egress port for each forwarding element along the path.

20 Claims, 6 Drawing Sheets

Related U.S. Application Data on Mar. 8, 2018, provisional application No. 62/646,341, filed on Mar. 21, 2018.

(51) Int. Cl.

| | | |
|---|---|---|
| *H04L 12/24* | (2006.01) | |
| *H04L 12/741* | (2013.01) | |
| *H04L 12/26* | (2006.01) | |
| *H04L 29/06* | (2006.01) | |
| *H04L 12/773* | (2013.01) | |
| *H04L 9/06* | (2006.01) | |

(52) U.S. Cl.
CPC .............. *H04L 41/12* (2013.01); *H04L 43/10* (2013.01); *H04L 45/26* (2013.01); *H04L 45/32* (2013.01); *H04L 45/34* (2013.01); *H04L 45/38* (2013.01); *H04L 45/60* (2013.01); *H04L 45/72* (2013.01); *H04L 45/74* (2013.01); *H04L 45/745* (2013.01); *H04L 63/062* (2013.01); *H04L 63/101* (2013.01); *H04L 69/22* (2013.01); *H04L 9/0643* (2013.01)

(56) References Cited

U.S. PATENT DOCUMENTS

| | | | |
|---|---|---|---|
| 7,852,771 B2 | 12/2010 | Ashwood-Smith | |
| 8,619,546 B2 | 12/2013 | Nandagopal et al. | |
| 9,948,518 B2 | 4/2018 | Kamath et al. | |
| 2003/0061479 A1 | 3/2003 | Kimura | |
| 2003/0133576 A1 | 7/2003 | Grumiaux | |
| 2005/0041590 A1 | 2/2005 | Olakangil et al. | |
| 2006/0013210 A1 | 1/2006 | Bordogna et al. | |
| 2007/0091911 A1 | 4/2007 | Watanabe et al. | |
| 2010/0061272 A1 | 3/2010 | Veillette | |
| 2012/0144014 A1 | 6/2012 | Natham et al. | |
| 2012/0215932 A1 | 8/2012 | Shemesh | |
| 2014/0241345 A1* | 8/2014 | DeCusatis ............... H04L 49/25 370/355 | |
| 2015/0334043 A1* | 11/2015 | Li .......................... H04L 47/783 709/213 | |
| 2016/0226700 A1 | 8/2016 | Zhang et al. | |
| 2016/0248686 A1 | 8/2016 | Lee et al. | |
| 2016/0277282 A1* | 9/2016 | Chen ..................... H04L 45/122 | |
| 2017/0279676 A1* | 9/2017 | Lu ........................ H04L 41/0816 | |
| 2018/0006945 A1 | 1/2018 | Flajslik et al. | |
| 2019/0182143 A1 | 6/2019 | Kim et al. | |
| 2019/0182149 A1 | 6/2019 | Kim et al. | |
| 2019/0182154 A1 | 6/2019 | Kim et al. | |
| 2019/0182367 A1 | 6/2019 | Kim et al. | |

OTHER PUBLICATIONS

Stoica, Ion, "CSFQ: Core-Stateless Fair Queueing—Technical Overview," Month Unknown 2000, 2 pages, Carnegie Mellon University, retrieved at http://www.cs.cmu.edu/~istoica/csfq/.

Elmeleegy, Khaled, et al., "EtherFuse: An Ethernet Watchdog," SIGCOMM'07, Aug. 27-21, 2007, 12 pages, ACM, Kyoto, Japan.

Godfrey, P. Brighten, et al., "Pathlet Routing," SIGCOMM'09, Aug. 17-21, 2009, 12 pages, ACM, Barcelona, Spain.

Lakshminarayanan, Karthik, et al., "Achieving Convergence-Free Routing using Failure-Carrying Packets," SIGCOMM'07, Aug. 27-31, 2007, 12 pages, ACM, Kyoto, Japan.

McCauley, James, et al., "The Deforestation of L2," SIGCOMM'16, Aug. 22-26, 2016, 14 pages, ACM, Florianopolis, Brazil.

Non-Published commonly Owned U.S. Appl. No. 15/948,990, filed Apr. 9, 2018, 61 pages, Barefoot Networks, Inc.

Non-Published commonly Owned U.S. Appl. No. 15/948,991, filed Apr. 9, 2018, 61 pages, Barefoot Networks, Inc.

Non-Published commonly Owned U.S. Appl. No. 15/948,992, filed Apr. 9, 2018, 60 pages, Barefoot Networks, Inc.

Non-Published Commonly Owned International Patent Application PCT/US19/20842, filed Mar. 5, 2019, 61 pages, Barefoot Networks, Inc.

PCT International Search Report for Commonly Owned International Patent Application PCT/US2019/020842, dated Apr. 25, 2019, 14 pages, International Searching Authority—EPO.

First Office Action for U.S. Appl. No. 15/948,990, dated Aug. 21, 2019, 12 pages.

First Office Action for U.S. Appl. No. 15/948,991, dated Aug. 8, 2019, 7 pages.

First Office Action for U.S. Appl. No. 15/948,992, dated May 30, 2019, 12 pages.

Jin, Xin, et al., "Your Data Center Switch is Trying Too Hard," SOSR '16: Proceedings of the Symposium on SDN Research, Mar. 14-15, 2016, 6 pages, ACM, Santa Clara, CA, USA.

\* cited by examiner

```
1   header_type head_t {
2       fields  {
3           preamble: 64;
4           protocol_type: 8;
5           num_total_hops: 16;
6           num_taken_hops: 5;
7           unused_ports: *;
8       }
9       length: 13 + (num_taken_hops * 4);
10      max_length: 37;
11  }
12
13  header_type port_t {
14      fields  {
15          switch_id: 16;
16          in_port: 8;
17          out_port: 8;
18      }
19
20  header_type port_t {
21      fields  {
22          switch_id: 22;
23          in_port: 4;
24          out_port: 6;
25      }
26
              ●
              ●
              ●
```

*Figure 2*

SOURCE ROUTING DESIGN WITH SIMPLIFIED FORWARDING ELEMENTS

BACKGROUND

In recent years, there has been a plethora of innovation in the field of networking. These innovations have included the introduction of network operating systems for providing a common platform for programming forwarding elements by different vendors, controller designs for remotely configuring the local control planes of forwarding elements, and schemes for implementing multiple logical networks on shared physical network fabric.

However, none of these innovations have dealt with complexity of managing the local control planes of the managed forwarding elements, and the problems that these local control planes create for hassle-free network management. Many bugs in network forwarding elements are the result of the local control plane software, and not directly from hardware. Moreover, developing and maintaining this software infrastructure is time-consuming and expensive, as it must be ported for each new chip that is developed. Also, traditional designs often have problems of keeping per-message consistency when updating the network. Specifically, the two-tiered control plane (i.e., the global controller and the collection of local switch controllers) is a complicated distributed system with the typical associated state management problems. Simply maintaining the forwarding rule table is a very challenging task. It is known that installing forwarding rules in an ad-hoc manner can lead to transient configuration problems, such as black-holes or path loops.

SUMMARY

Some embodiments of the invention provide novel forwarding element designs and network architectures. Some of these novel designs and architectures use a set of one or more global control plane servers to identify the network topology and to provide the identified topological information to end machines connected to the network, so that these end machines can employ source-routing message headers to direct the forwarding elements to forward the data messages between the end machines. In the discussion below, this novel source-routing network architecture is referred to as Managed Source Routing (MSR) network architecture.

Some MSR network designs completely eliminate the control plane from the forwarding elements. These forwarding elements are referred to below as control-plane less (CPL) forwarding elements. In some embodiments, these CPL forwarding elements also do not have forwarding tables, as these embodiments use specialized source-routing message headers to provide the forwarding element with all the necessary runtime state to forward the data messages. To manage states that are typically controlled by counters in traditional forwarding elements, some embodiments use registers in the forwarding elements that can be accessed in the data plane.

In some of these designs, the data plane of the forwarding elements is programmable to allow custom logic and hard state to be directly encoded into the data plane at compile time, without relying on control plane to run protocols. The programmable data plane of these CPL forwarding elements allows them to implement advanced features like server bootstrapping (e.g., DHCP, service discovery) and network failover (routing, topology discovery) that are beneficial for the source-routing scheme of some embodiments. For example, this programming can direct how the forwarding element re-purposes the end-machine based source-routing header to notify a global control plane (GCP) server set or end machine of a failed link/port. The MSR network architecture of some embodiments generates customized data planes that are tailored to a particular deployment and pre-programmed with a minimal set of static, local state at compile time.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

FIG. 2 illustrates an example message header that an end-node machine attached to a message in some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide novel forwarding element designs and network architectures. Some of these novel designs and architectures use a set of one or more global control plane servers to identify the network topology and to provide the identified topological information to end machines connected to the network, so that these end machines can employ source-routing message headers to direct the forwarding elements to forward the data messages between the end machines. In the discussion below, this novel source-routing network architecture is referred to as Managed Source Routing (MSR) network architecture.

Some MSR network designs completely eliminate the control plane from the forwarding elements. These forwarding elements are referred to below as control-plane less (CPL) forwarding elements. In some embodiments, these CPL forwarding elements also do not have forwarding tables, as these embodiments use specialized source-routing message headers to provide the forwarding element with all the necessary runtime state to forward the data messages. To manage states that are typically controlled by counters in traditional forwarding elements, some embodiments use registers in the forwarding elements that can be accessed in the data plane.

In some of these designs, the data plane of the forwarding elements is programmable to allow custom logic and hard state to be directly encoded into the data plane at compile time, without relying on control plane to run protocols. The programmable data plane of these CPL forwarding elements allows them to implement advanced features like server boot-strapping (e.g., DHCP, service discovery) and network failover (routing, topology discovery) that are beneficial for the source-routing scheme of some embodiments. For example, this programming can direct how the forwarding element re-purposes the end-machine based source-routing header to notify the GCP server set or end machine of a failed link/port. The MSR network architecture of some embodiments generates customized data planes that are tailored to a particular deployment and pre-programmed with a minimal set of static, local state at compile time.

Figure 1:
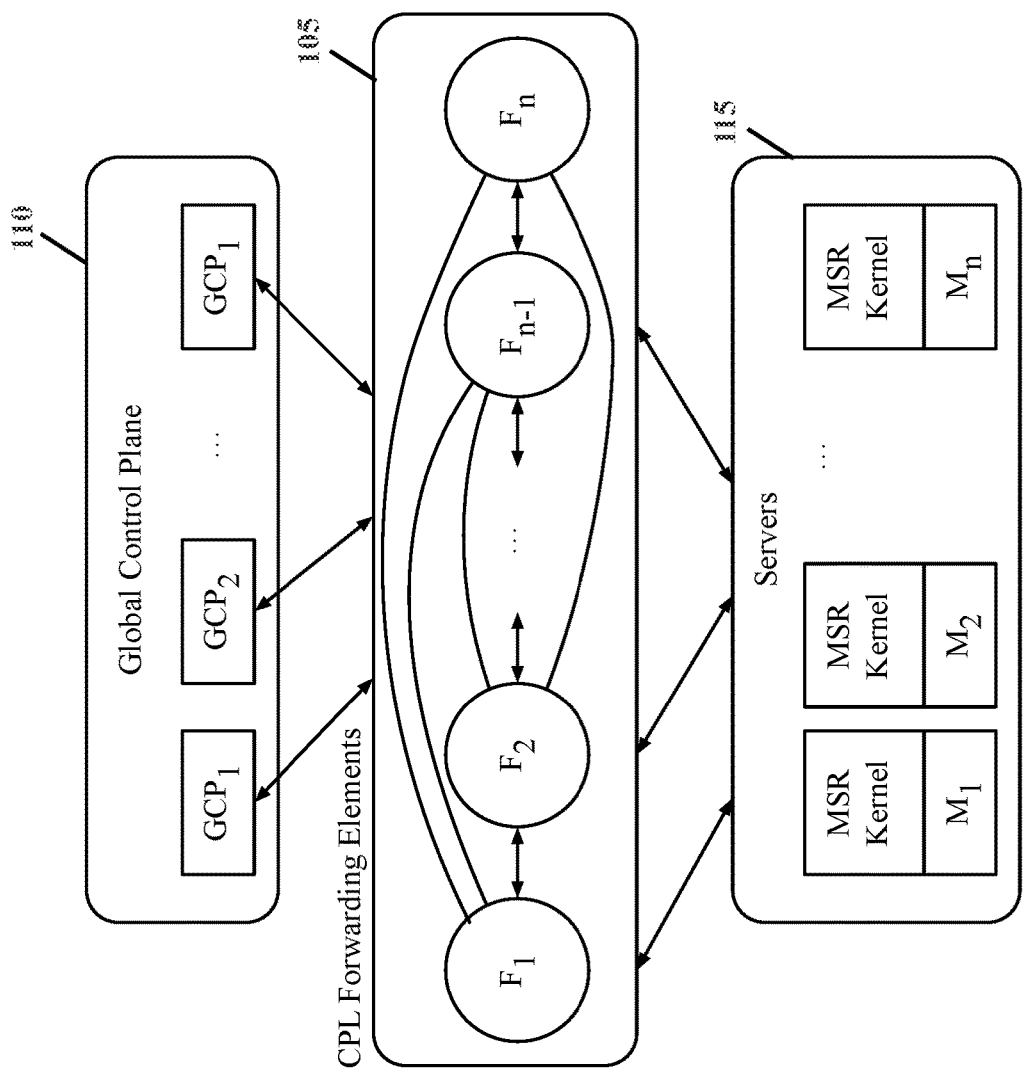
FIG. 1 illustrates a managed source routing network of some embodiments.

FIG. 1 illustrates an MSR network 100 architecture of some embodiments. As shown, the MSR network in this architecture has three types of components, which are (1) CPL forwarding elements 105, (2) a set of GCP servers 110, and (3) message end-node machines 115. The end-node machines 115 are the sources and destinations of the data messages that the CPL forwarding elements 105 forward. In other words, the CPL forwarding elements 105 are part of the network fabric that communicatively connects the end-node machine 115. The GCP server set maintain an up-to-date view of the network topology and provides this view to end machines 105, so that these end machines can employ source-routing message headers to direct the forwarding elements to forward the data messages between the end machines. In some embodiments, the MSR network 100 can be used to define multiple logical networks that are implemented by the shared network fabric that is provided by the CPL forwarding elements 105.

The CPL forwarding elements 105 of some embodiments are hardware forwarding elements that include one or more network forwarding integrated circuits to implement the data plane. These CPL forwarding elements 105 perform only simple, predefined operations with minimal required state. These simplified forwarding elements do not have local control plane functionality as the control plane functionality has been delegated to the GCP server set. In some embodiments, the CPL forwarding elements do include a CPU with a minimal forwarding element operating system that handles initial configuration of the data plane. Also, most of the forwarding state needed by these forwarding elements is embedded in the message header. To manage states that are typically controlled by counters, these forwarding elements have registers that can be accessed through their data planes. As mentioned above, the CPL forwarding elements of some embodiments have programmable data planes, which may be programmed at initialization with minimal state, and then only subsequently updated via data plane operations.

In some embodiments, the state installed at initialization includes a switch identifier and logical to physical port mappings. To implement logical port mappings in some such embodiments, the programmable data planes of the CPL forwarding elements can be used to define static mappings in the data plane program itself. For example, some embodiments define static mapping between the physical and the logical ports of the forwarding element in a high-level program (such as a P4 program) that is used to configure the CPL forwarding element and install this program at initialization of the forwarding element. As these states (switch identifier, logical to physical port mappings) are not frequently changed during runtime, any changes to the states can be introduced via recompilation of a new data plane program with the new states.

The programmable data plane of these CPL forwarding elements 105 allows these elements to implement advanced features like server boot-strapping (e.g., DHCP, service discovery) and network failover (routing, topology discovery) that are beneficial for the source-routing scheme of some embodiments. For example, this programming can direct how the forwarding element re-purposes the end-machine based source-routing header to notify the GCP server set or end machine of failed a link/port. The MSR network architecture of some embodiments generates customized data planes that are tailored to a particular deployment and pre-programmed with a minimal set of static, local state at compile time.

The GCP server set 110 acts as the main controller of the network to perform a set of similar functionalities that are traditionally performed by the local control planes of the forwarding elements. In addition, the GCP server set 110 also acts as the state manager for the entire network by keeping an up-to-date state of the various network states, such as the network topology, port availability, etc. The GCP server set in some embodiments is configured to be hosted on a single server, while in other embodiments, it is implemented by multiple servers that coordinate using a general consensus algorithm (e.g., Paxos). In some embodiments, a GCP server can move from one server to another server in case of a failure for increased availability.

The end-node machines 115 in the MSR network of some embodiments are responsible for locally storing the latest network states and topology, either by directly querying the GCP server set for the needed states or by updating their local states based on the messages received from the protocol, e.g., failover procedures employed by the CPL forwarding elements. At initialization, an end-node machine 115 requests the current network topology and other state from the GCP server set.

Once it has a local copy of the state of the network, the end-node machine 115 of some embodiments makes its own routing decisions by calculating the optimal paths for the messages to traverse through. This routing algorithm is highly configurable and can be customized for various network requirements, such traffic engineering or access control. For simplicity, the algorithm of choice in some embodiments is shortest path routing. Then the computed path information is attached as the forwarding header of every message that the end-node machine sends out. Some embodiments implement an end-node machine's routing and local state management without changing the application layer of this machine by adding customized network stack in its kernel layer. In addition, in some embodiments, the GCP server set 110 calculates the routes rather than having the end-node machines 115 do the calculations. However, this requires that the GCP server set have the most up-to-date topology and provide new routes to the end-node machines after link failures.

In some embodiments, the GCP server set 110 initially provides the network topology to the end-node machines 115 (i.e., the connections between all of the CPL forwarding elements 105 and the locations of the other end-node machines in this topology). In addition, the information for the CPL forwarding elements is provided by the GCP server set in some embodiments. Once the data planes of the CPL forwarding elements 105 are configured (e.g., with the minimal state information), then the CPL forwarding elements can begin forwarding traffic from the end-node machines 115.

End-node machines serve as good locations for managing many network decisions. After all, application flows start from and terminate at end-node machines. In fact, many per-flow decisions, like access control, are already made at the edge today. Moreover, some overlay solutions also make load-balancing and routing decisions at end-node machines. Finally, forwarding decisions at the source end-node machine alleviates the need to make consistent forwarding state update across forwarding elements, avoiding transient configuration problems, such as black-holes or path loops.

FIGS. 2-5 illustrate examples of several MSR protocols of some embodiments that allow simplified CPL forwarding elements of these embodiments to perform the desired source routing operations. These protocols define the minimum set of headers, fields and message types required to guarantee forwarding, bootstrapping and quick failure recovery. As further described below, these protocols start with a header that specifies the message type of the message, number of total hops for the message to take and number of hops already taken by the message. This information is then followed by a list of input and output port identifier (ID) pairs, with each pair corresponding to one forwarding element that the message traverses, each input port in the pair identifying the ingress input port through which the message will enter the forwarding element, and the output port in the pair identifying the egress output port through which the message will exit the forwarding element. In some embodiments, the ingress port for each forwarding element is left empty in the initial message header, and each forwarding element fills in the port at which it receives the message. Based on the protocol, this list can be used in various formats, which we will discuss in detail below.

To operate a network with a set of simplified CPL forwarding elements, some embodiments use a set of source-routing protocols, as mentioned above. Source routing is a method of routing where the end-node machine 115 completely or partially specifies the path for each message in the message header. In some embodiments, the source end-node machine 115 adds the input and the output port pairs for each hop (i.e., each CPL forwarding element) along the desired path from the source end-node machine 115 to the destination end-node machine 115. Upon receiving such messages, the forwarding elements forward messages based on their header egress-port data.

FIG. 2 illustrates an example message header that an end-node machine 115 attached to a message in some embodiments. This message header uses the syntax of the P4 network programming language. As shown, the header head t defines a header type containing the identifier for the message, the type of the message and the number of hops that the message must take. The header is followed by a list of port t, which specifies the input and the output port for the message to traverse through on each forwarding element (FE) identified by the FE_ID field.

Figure 3:
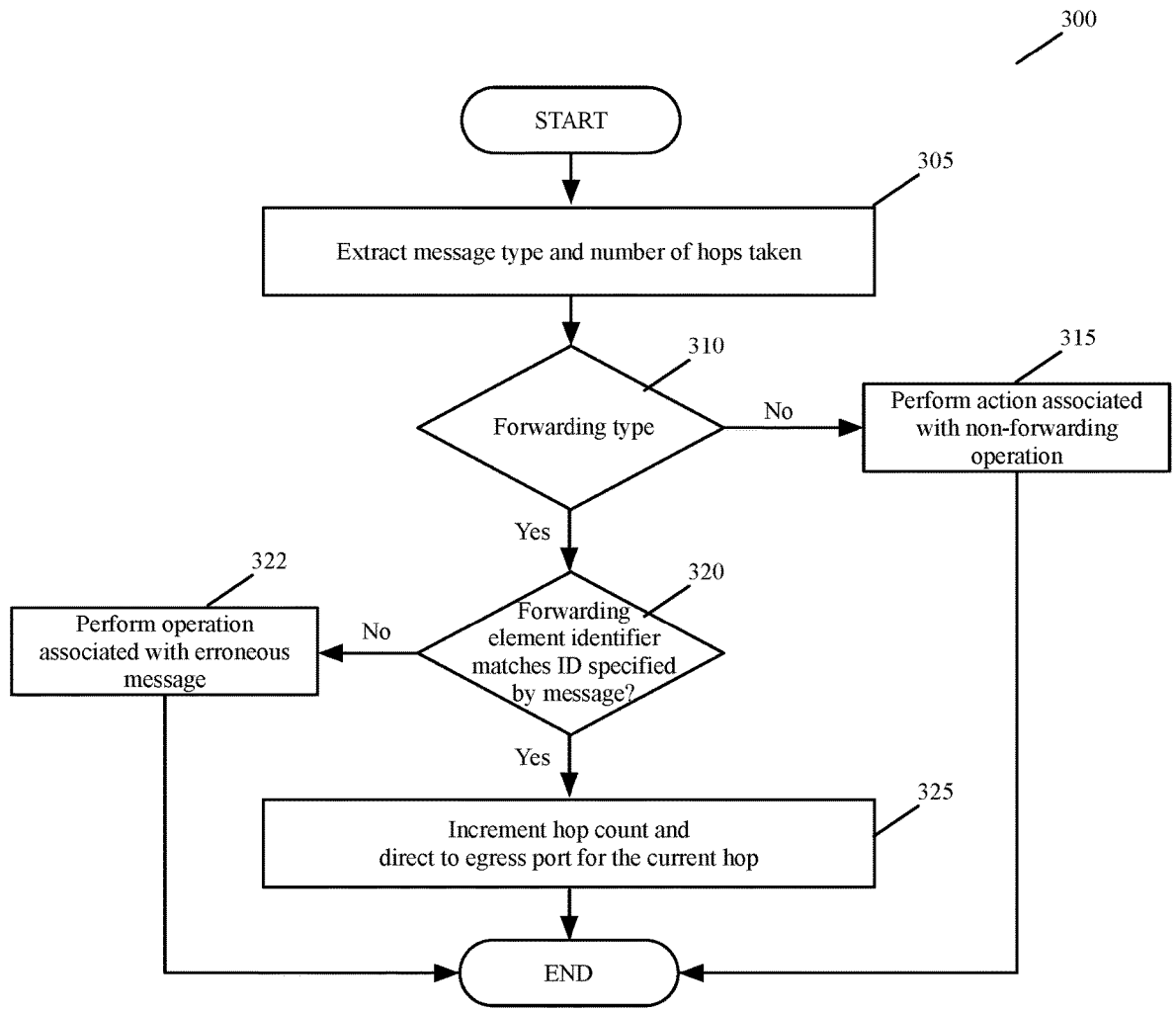
FIG. 3 illustrates a process performed by a forwarding element when it receives a message in the format of FIG. 2.

FIG. 3 illustrates a process 300 performed by a forwarding element when it receives a message in the format of FIG. 2. As shown, the forwarding element first extracts (at 305) from the header_t header the message type and the number of hops already taken, which, as further described below, is used to identify the port in the list of ports to examine. Next, at 310, the forwarding element determines whether the message type is Forwarding. If not, the message type is another type message (e.g., a programming type) and the forwarding element performs (at 315) a non-forwarding operation (e.g., a programming operation) based on the parameters specified in this message.

On the other hand, when the message type is forwarding, then the forwarding element checks (at 320) to see whether the FE_ID in the input/output port pair identified by the extracted number of hops matches with forwarding element's own ID. When the forwarding element determines that the FE_ID, the forwarding element performs (at 322) an error handling operation associated with an erroneously received message. In some embodiments, the forwarding element just discards the message, while in other embodiments the forwarding element returns an error message to the source end-node destination.

When the forwarding element determines (at 320) that the forwarding element's identifier matches that FE_ID in the message's header for the current hop matches its forwarding-element identifier, the forwarding element then (at 325) increment the number of hops in the message header and then forwards the message along its egresses port that is identified by the output port of the identified input/output port pair. The forwarding approach of FIGS. 2-3 does not need a forwarding table, as the forwarding elements simply parse and use the port IDs defined in the message. It also does not need a control plane, because there are no variable states required for forwarding.

The forwarding process of a forwarding element is different in other embodiments. For instance, in some embodiments, the forwarding element not only checks the FE_ID in the message header for the current hop's input/output pair, but also checks the ingress port in this pair to make sure it matches the ingress port at which the message was received by the forwarding element. If not, the forwarding element transitions to 322 to perform its error handling operation. Also, in some embodiments, the forwarding element increments the hop count before identifying the current hop's ingress/egress port (e.g., after extracting the hop count at 305 and before performing the check at 310), as in these embodiments each forwarding element generates its own hop count to identify the current hop count, instead of using the hop count embedded in the received message as the current hop count. In other embodiments, the message does not have the ingress port for the forwarding element, and the forwarding element fills in this ingress port in addition to incrementing the hop count. After 315, 322 and 325, the forwarding process ends.

Some embodiments use a bootstrapping process to add a new forwarding element or end-node machine to the MSR network. Once the bootstrapping process is successfully completed, the newly added entity successfully notifies the GCP server set of its location in the network with the GCP acknowledging all of the links in the newly added entity. The bootstrapping process of some embodiments accounts for several issues in the MSR network 100. First, given the CPL forwarding elements lack local control planes to install the forwarding rule in the neighboring forwarding elements, the newly added entity must be able to know the estimated path to make the best attempt to notify the GCP server set of its state and location. If the path is unknown or the GCP server set cannot be reached, then the entity must also be able to flood the network in a smart fashion, that ensures eventual notification to the GCP server set.

Another complication arises due to the dynamic nature of the GCP server set. For fault tolerance and scalability reasons, some embodiments configure the GCP server set to include multiple host machines configured as a cluster and serving requests and keeping distributed states via consensus protocols (such as Paxos or Raft). This means that the location of the GCP server set can change dynamically and the bootstrap process must be able to deal with GCP location changes.

Figure 4A:
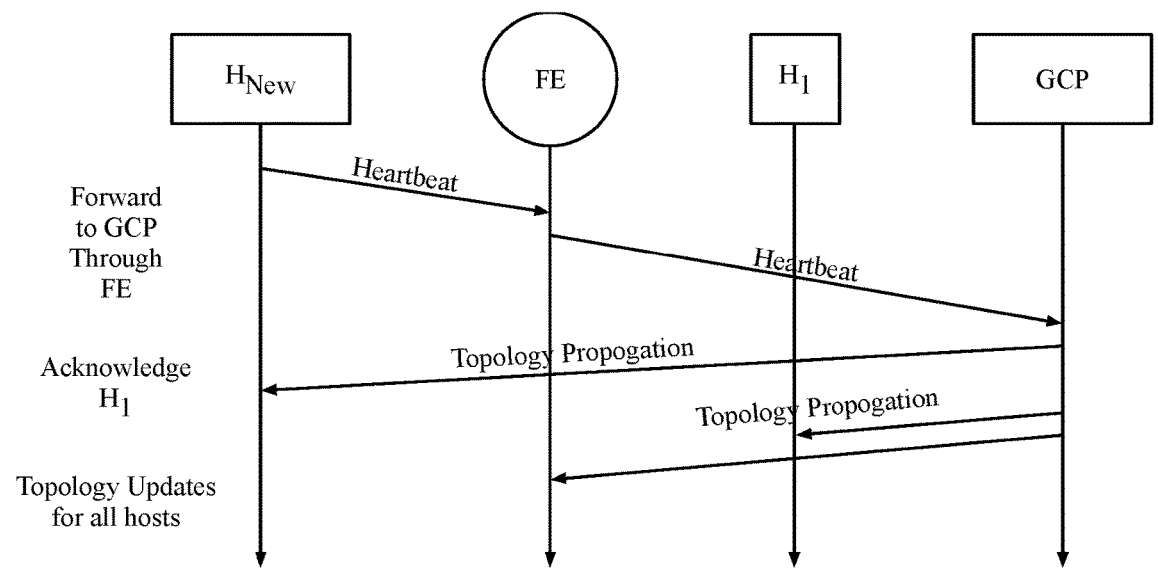
FIGS. 4A and 4B presents a high-level overview of the bootstrapping process of some embodiments.
Figure 4B:
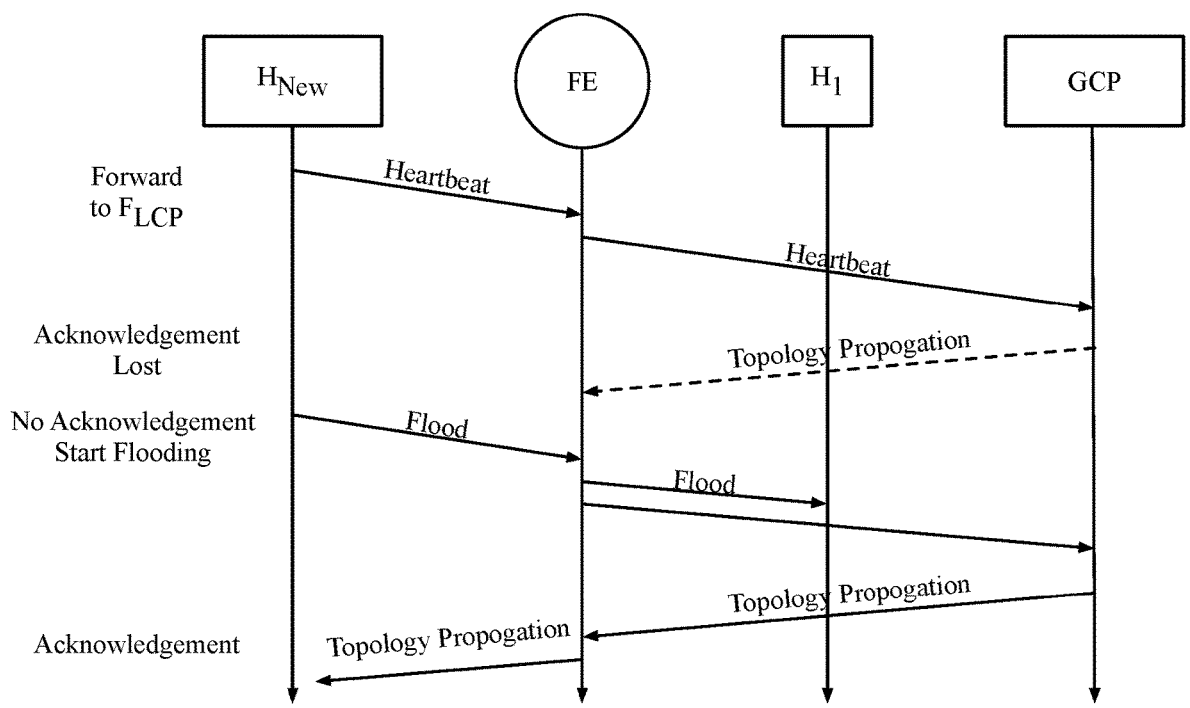

FIGS. 4A and 4B presents a high-level overview of the bootstrapping process of some embodiments. These figures present a timeline diagram that illustrates a process of bootstrapping a new host, which is an example of an end-node machine. This process starts when a new host $H_{new}$ connects to the network. When configuring $H_{new}$, the host is configured with the latest network topology available at configuration time. Given the topology, $H_{new}$ will send a message with a Heartbeat message type to the GCP server set. After the host sends this message, there are two scenarios that can occur. First scenario is when the GCP server set successfully acknowledges the heartbeat and sends the latest topology to $H_{new}$ with a Topology Propagation message type. The updated topology will be in the payload of the message. In this case, the bootstrap has completed successfully. This scenario is illustrated by FIG. 4A.

FIG. 4B illustrates the second scenario, which occurs when $H_{new}$ does not receive an acknowledgement within a predefined time. In this case, $H_{new}$ will make an attempt to notify its existence to all the hosts in the network by flooding the network. To do so, $H_{new}$ will send a message with a Flood message type to the next hop forwarding element. Upon receiving the message, the forwarding element determines the method to multicast the message to the subset of its ports. Once the GCP server set eventually receives the message originating from $H_{new}$, it will acknowledge by returning a message with a Topology Propagation message type and the current network topology.

Flooding the network has a high cost as it adds to network congestion and processing. However, some embodiments employ various methods to flood the network more efficiently by taking into account the network topology. For instance, some embodiments use a fat-tree topology as follows. First, the forwarding elements maintain the state of which ports belong to the uplink and which ports belong to the downlink. In some embodiments, this state is installed via the programmed definition at compile time. When the flooding message is received from a downlink port, the forwarding element multicasts the message to all of its ports. Otherwise, when the flooding message is received from an uplink port, the forwarding element multicasts the message only to the downlink of the port. This method ensures that the messages will eventually reach all the hosts without causing loops and generating extra messages and can significantly reduce the flooding overhead.

One issue about using the GCP server set to manage the topology and having the end-node machines compute the path to use is the delay with which the end-node machine and the GCP server set react to a path failure. Without any quick failover methods, it will take a considerable amount of time for the GCP server set to be notified of failed links, and similarly, the end-node machine must wait for the GCP server set to send updated topology information once the GCP server set receives some acknowledgements of the failed link.

Figure 5:
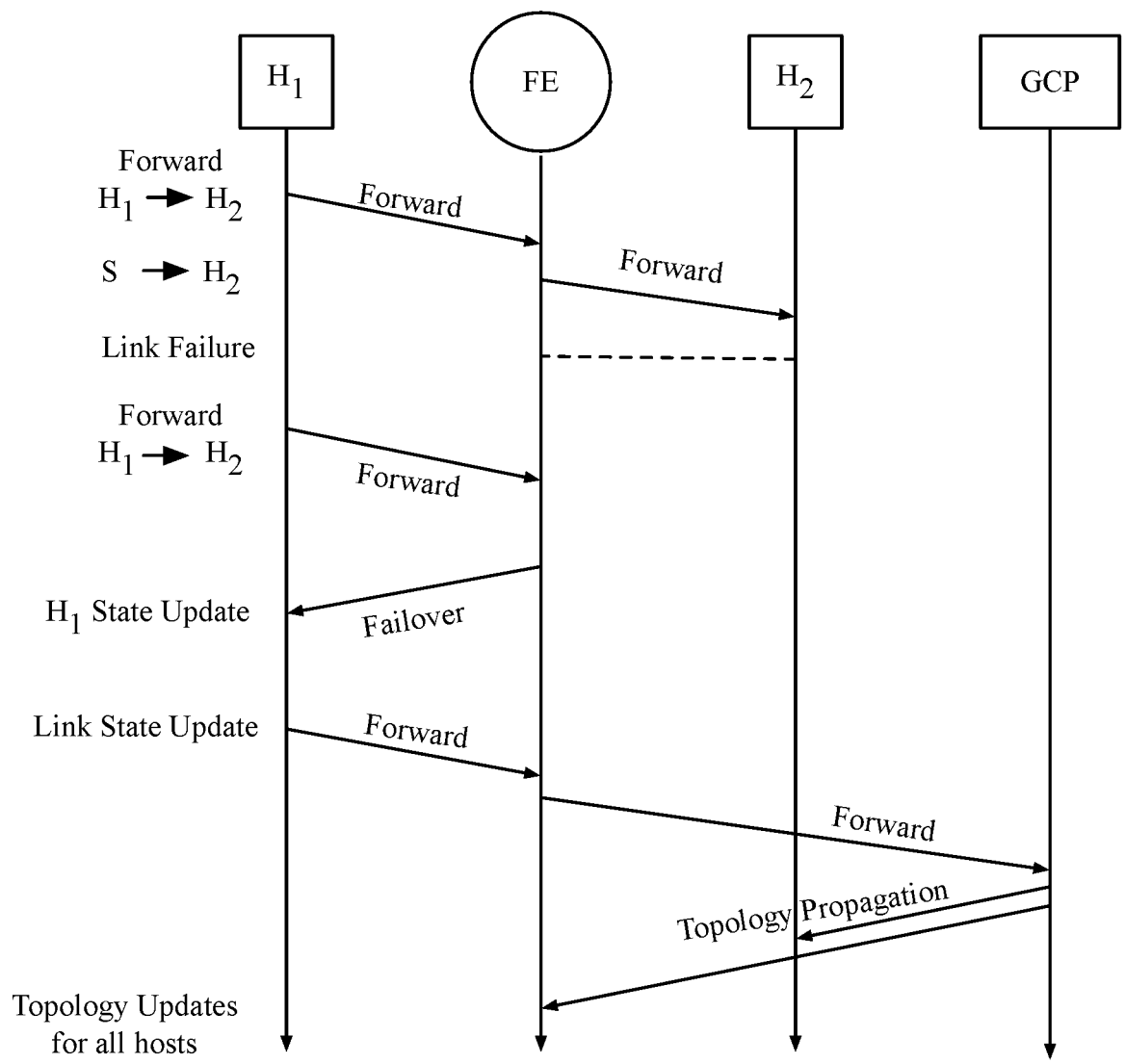
FIG. 5 presents a high-level illustration of this failover process.

In order to reduce the latency between the link failure and the state update by the GCP server set, some embodiments use a novel failover process. FIG. 5 presents a high-level illustration of this failover process. This failover process is a quick failover procedure to propagate forwarding-element locally detected failures to the GCP server set. In this failover process, the failed forwarding element immediately sends a failure signal back to the end-node machine of the message when it detects that its egress port for this message or the link between this egress port and the next forwarding element's ingress port is down.

Once the forwarding element receives a message that is destined to exit toward a failed link (due to the failure of its egress port or the failure of the link to the next hop's ingress port), the forwarding element updates the protocol type of the message to be a Failover type. The forwarding element will then use the same list of ports in the reverse direction to specify a path back to the source end-node machine. Once the source end-node machine for the message receives the return message, the source end-node machine sends the failure status to the GCP server set using a Link_State_Update protocol. Upon receiving the updates, GCP server set notifies all the end-node machines of interest with the updated topology.

When an entity recovers from a failure, the entity in some embodiments notifies the GCP server set with the change in its state. In order to do so, the entity performs a similar operation as the bootstrap process described above. In some embodiments, the recovered entity will send a heartbeat using the cached port or path that leads to the GCP server set or use flooding when the heartbeat fails. If the GCP server set receives the updated heartbeat, it will notify the updates to all the end-node machines using the recovered entity at least once. In this case, every end-node machine is notified of the recovery and the recovery process is complete.

To handle failover, some embodiments program portmappings by using topology blueprints, which change much less often than forwarding element software upgrades, into the data plane and use these blueprints to immediately select an alternative port among LAG group upon port failure.

Below is a description of several protocols used by the components of the MSR network of some embodiments. Some of these protocols were described above, although for the embodiments described below, these protocols might be implemented differently than those described above. In some embodiments, all components of the MSR network 100 implement (1) forwarding protocol, (2) a failover protocol and (3) a heartbeat protocol.

As described above, the forwarding protocol is the baseline protocol required for routing in the CPL networks of some embodiments. The protocol includes a set of header fields specifying the length of the path, followed by the set of input and output port for every hop. The failover protocol is used when the forwarding element receives a message that is to be egressed to a failed port or through a failed link. It is similar to the forwarding protocol, except that the message is routed in a reverse direction back to the sender.

The heartbeat protocol is used by the GCP server set to ping the host or the forwarding element to check for its liveness. After receiving the heartbeat protocol, the receiver acknowledges the ping similar to how it returns a message via the failover protocol. The interval at which the heartbeat is sent is customized based on the need of the network.

In some embodiments, the GCP server set initiates other protocols, mainly to send and receive updates of the network topology. These protocols include a path propagation protocol, a topology propagation protocol, machine/link protocol, and a consensus protocol. In order to allow for the forwarding elements to contact the GCP server set, some embodiments keep the set of paths to the GCP server set servers. The path propagation protocol is used to send the path information from the GCP server set to the forwarding elements whenever the location of the GCP server set changes.

The topology propagation protocol allows the transfer of the currently known network topology to the end-node machine. The topology information is embedded in the payload in some embodiments. The machine/link discovery protocol is used to discover a newly added machine or a link in the network. This protocol is used for bootstrapping purposes in some embodiments. The consensus protocol is used among GCP server sets to send and receive consensus messages.

Another protocol in some embodiments is the link state update protocol. This protocol initiated by an end-node machine when it receives a failover message that it sends. The end-node machine uses this protocol to notify the GCP server set of the failed link, so that the topology updates can be propagated to all of the other end-node machines.

Figure 6:
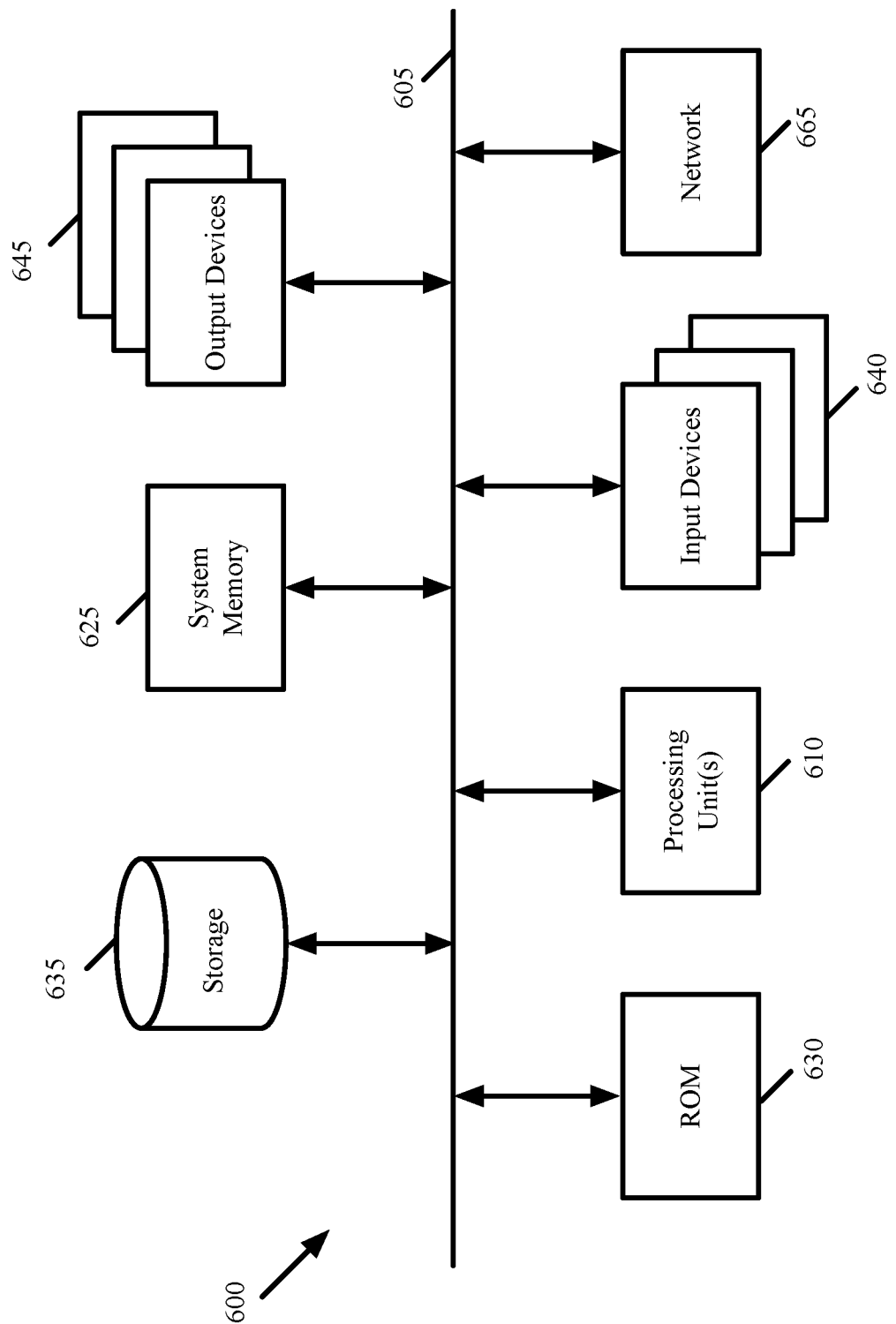
FIG. 6 conceptually illustrates an electronic system 600 with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random-access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieves instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A network comprising:
a plurality of forwarding elements;
a set of one or more global control plane (GCP) servers to maintain topological information about connections between the forwarding elements; and
a plurality of end-node machines, wherein a particular end-node machine is (i) to receive the topological information, (ii) to identify a source-routing path for a message to be sent by the particular end-node machine, and (iii) to embed the source-routing path in a source-routing message header that includes an egress port for each forwarding element along a path of the message.

2. The network of claim 1, wherein the source-routing message header further includes a hop count that is incremented by each forwarding element along the message's path and that is used by each forwarding element along the message's path to identify the egress port associated with the forwarding element.

3. The network of claim 2, wherein:
the source-routing message header further includes a forwarding element (FE) identifier for each egress port; and
when a forwarding element receives a message, the forwarding element (i) is to determine whether an FE identifier identified by the hop count in the message header corresponds to an identifier of the forwarding element and (ii) if so, increment the hop count in the message header and transmit the message via the egress port included in the message header for the forwarding element.

4. The network of claim 2, wherein:
the source-routing message header further includes a forwarding element (FE) identifier for each egress port; and
when a forwarding element receives a message, the forwarding element (i) is to determine whether the FE identifier of a port pair identified by the incremented hop count in the message header corresponds to an ingress port of the forwarding element and (ii) if so, fill in the ingress port at which the forwarding element received the message and transmit the message via the egress port included in the message header for the forwarding element.

5. The network of claim 2, wherein:
the message header further includes a message type that specifies one of a plurality of message types including a forwarding type; and
when a forwarding element receives the message, the forwarding element is to determine whether the message header specifies a forwarding type, and if so, the forwarding element is to transmit the message along its egress port identified by the hop count associated with the forwarding element so long as the message header specified an ingress port of the forwarding element for this hop count.

6. The network of claim 1, wherein the forwarding elements are control-plane less (CPL) forwarding elements that do not include control plane circuits.

7. The network of claim 6, wherein the CPL forwarding elements also do not include forwarding tables to store flow-forwarding rules, wherein a forwarding table comprises (i) a set of flow-identifiers to compare with a received message's set of flow attributes, and (ii) a set of action parameters that specify a forwarding operation to perform on a received message that has a set of flow attributes matching the flow-identifier of the rule.

8. The network of claim 7, wherein the source-routing messages that the forwarding elements process do not have layer 2-layer 4 header values in the source-routing message headers.

9. The network of claim 6, wherein the CPL forwarding elements include programmable data plane circuits to program components of the data plane circuits through messages processed by the data plane circuits.

10. The network of claim 9, wherein programmability of the data plane is to permit the data plane of the forwarding elements to be configured remotely to implement bootstrapping and failover operations.

11. The network of claim 1, wherein the forwarding elements comprise (i) one or more network forwarding integrated circuits to perform data plane operations and (ii) a central processing unit (CPU) to initialize the data plane of the network forwarding integrated circuits.

12. The network of claim 11, wherein the CPU does not modify the data plane during runtime of the forwarding element.

13. The network of claim 1, wherein when a forwarding element that receives the message determines that the egress port included in the source-routing message header for the forwarding element is failed, the forwarding element is to send the message back to the end-node machine that sent the message.

14. The network of claim 13, wherein the forwarding element is to update a protocol of the message to be a failover message before sending the message back to the end-node machine that sent the message.

15. The network of claim 14, wherein the forwarding element is to use the source-routing message header to specify a path for the failover message back to the end-node machine that sent the message.

16. The network of claim 14, wherein the end-node machine is to store the received topological information, wherein the end-node machine that sent the message is to update the stored topological information based on the failover message.

17. The network of claim 16, wherein the end-node machine that sent the message is to provide the update to the GCP server set in order for the GCP server set to update the topological information.

18. The network of claim 1, wherein based on a new end-node machine being added to the network, the new end-node machine is to send an initial heartbeat message to the GCP server set.

19. The network of claim 18, wherein the GCP server set is to respond to the initial heartbeat message by providing the topological information to the new end-node machine.

20. The network of claim 18, wherein based on the GCP server set does not respond to the new end-node machine within a predetermined time, the new end-node machine is to flood the network with a flooding packet and the forwarding elements are to propagate the flooding packet.

* * * * *